United States Patent
Scandola et al.

(10) Patent No.: US 10,784,780 B1
(45) Date of Patent: Sep. 22, 2020

(54) TRANSIENT EFFECT REDUCTION FOR SWITCHED-MODE POWER SUPPLY (SMPS)

(71) Applicant: Infineon Technologies AG, Neubiberg (DE)

(72) Inventors: Luca Scandola, Villafranca di Verona (IT); Stefano Orlandi, San Bonifacio (IT); Cristian Garbossa, Bressanone (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/593,881

(22) Filed: Oct. 4, 2019

(51) Int. Cl.
*H02M 3/157* (2006.01)
*H02M 3/156* (2006.01)

(52) U.S. Cl.
CPC .... *H02M 3/157* (2013.01); *H02M 2003/1566* (2013.01)

(58) Field of Classification Search
CPC .. H02M 2003/1566; H02M 1/12; H02M 1/42; H02M 1/4225; H02M 1/4233; H02M 1/4241; H02M 1/4258; H02M 1/425; H02M 1/4208; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

2007/0247131 A1* 10/2007 Sohma ................. H02M 3/156 323/284
2019/0081546 A1* 3/2019 Hsu ...................... H02M 3/158

* cited by examiner

*Primary Examiner* — Bryan R Perez
(74) *Attorney, Agent, or Firm* — Shumaker & Sieffert, P.A.

(57) ABSTRACT

A controller circuit for generating a Pulse-Width Modulation (PWM) signal for activating a switching device of a Switched-Mode Power Supply (SMPS) includes gap detection circuitry, Pulse Frequency Modulated (PFM) circuitry, PWM circuitry and logic circuitry. The gap detection circuitry is configured to generate a shift signal based on an indication of a voltage difference between a reference voltage and a feedback voltage corresponding to voltage output by the SMPS. The PFM circuitry is configured to generate a hold signal indicating a target PFM frequency for the PWM signal. The PWM circuitry is configured to shift, based on the shift signal, a pedestal current to generate a shifted pedestal current and to generate, based on the shifted pedestal current, a peak signal indicating a target PWM on time for the PWM signal.

19 Claims, 12 Drawing Sheets

TRANSIENT EFFECT REDUCTION FOR SWITCHED-MODE POWER SUPPLY (SMPS)

TECHNICAL FIELD

This disclosure relates to techniques for reducing transient effects on a Switched-Mode Power Supply (SMPS).

BACKGROUND

A controller circuit may use control loops to regulate voltage output by a Switched-Mode Power Supply (SMPS). For example, the controller circuit may use Pulse Frequency Modulation (PFM) to regulate voltage at the SMPS during light loading of the SMPS. Upon detecting a change in loading at the SMPS from light to heavy, the controller circuit may instead use Pulse Width Modulation (PWM) to regulate voltage at the SMPS. In this way, the controller circuit may select a control loop (e.g., PFM or PWM) based on operating factors (e.g., loading, input voltage, etc.) to improve an operation (e.g., efficiency) of the SMPS.

SUMMARY

In general, this disclosure is directed to techniques for helping to reduce or eliminate undervoltage from transients in Switched-Mode Power Supplies (SMPSs), such as, for example, but not limited to, DC-DC converters. Rather than operating a controller circuit in an open loop control, the controller circuit may be configured to generate a shift signal based on an indication of a voltage difference between a reference voltage and a feedback voltage corresponding to voltage output by the SMPS. In this example, the shift signal may drive the controller to select a control loop (e.g., Pulse Frequency Modulation (PFM), Pulse Width Modulation (PWM)) during a transient condition (e.g., a sudden load increase) faster compared to controller circuits that omit a shift signal. In this way, the controller circuit may reduce transient effects on the SMPS.

In an example, a controller circuit for generating a PWM signal for activating a switching device of a SMPS includes: gap detection circuitry configured to generate a shift signal based on an indication of a voltage difference between a reference voltage and a feedback voltage corresponding to voltage output by the SMPS; PFM circuitry configured to generate a hold signal indicating a target PFM frequency for the PWM signal; PWM circuitry configured to shift, based on the shift signal, a pedestal current to generate a shifted pedestal current and to generate, based on the shifted pedestal current, a peak signal indicating a target PWM on time for the PWM signal; and logic circuitry configured to: in response to determining that the target PFM frequency is less than a PWM frequency value, generate the PWM signal comprising frequency corresponding to the target PFM frequency and comprising on time corresponding to a minimum PFM on time value; and in response to determining that the target PWM on time is greater than the minimum PFM on time value, generate the PWM signal comprising frequency corresponding to the PWM frequency value and comprising on time corresponding to the target PWM on time.

In another example, a method for generating a PWM signal for activating a SMPS includes: generating a shift signal based on an indication of a voltage difference between a reference voltage and a feedback voltage corresponding to voltage output by the SMPS; generating a hold signal indicating a target PFM frequency for the PWM signal; shifting, based on the shift signal, a pedestal current to generate a shifted pedestal current; generating, based on the shifted pedestal current, a peak signal indicating a target PWM on time for the PWM signal; in response to determining that the target PFM frequency is less than a PWM frequency value, generating the PWM signal comprising frequency corresponding to the target PFM frequency and comprising on time corresponding to a minimum PFM on time value; and in response to determining that the target PWM on time is greater than the minimum PFM on time value, generating the PWM signal comprising frequency corresponding to the PWM frequency value and comprising on time corresponding to the target PWM on time.

In another example, a circuit for switching a SMPS includes: a switching device configured to switch in and switch out based on a PWM signal; gap detection circuitry configured to generate a shift signal based on an indication of a voltage difference between a reference voltage and a feedback voltage corresponding to voltage output by the SMPS; PWM circuitry configured to shift, based on the shift signal, a pedestal current to generate a shifted pedestal current and to generate, based on the shifted pedestal current, a peak signal indicating a target PWM on time for the PWM signal; and logic circuitry configured to, in response to determining that the target PWM on time is greater than a minimum on time value, generate the PWM signal comprising frequency corresponding to a PWM frequency value and comprising on time corresponding to the target PWM on time.

Details of these and other examples are set forth in the accompanying drawings and the description below. Other features, objects, and advantages will be apparent from the description and drawings, and from the claims.

DETAILED DESCRIPTION

This disclosure is directed to techniques for helping to reduce or eliminate undervoltage from transients in Switched-Mode Power Supply (SMPS), such as, but not limited to, DC-DC converters. Some controller circuits separate control loops, which may result in only one loop being active during steady state (e.g., constant frequency with time on ("ton") modulation or frequency modulation with constant ton). In a system where a controller circuit uses multiple modulation schemes depending on operating points (e.g., SMPS loading, SMPS input voltage, etc.), an aspect is the transition between one loop to the other. For example, undervoltage may be caused by transitioning between Pulse Frequency Modulation (PFM), which controls the SMPS using a constant duty cycle or ton modulation and a varying frequency, and Pulse Width Modulation (PWM), which controls the SMPS using a constant frequency and a varying duty cycle or ton modulation. During the transition, the controller circuit may cross a state where no loops are active (e.g., open loop control). If this transition is associated with a severe transient (e.g. e.g., a load transient), the controller circuit may not regulate a controlled quantity (e.g. the output voltage) until transitioning to a correct control loop (e.g., PWM). Accordingly, a loss of control during these transients can cause undesirable undervoltage, which may result in failing a circuit design requirement.

Some systems use a higher setpoint when operating at a low load than when operating at a high load. In this way, when a SMPS loading increases from a low load to a high load, the undervoltage amount is reduced compared to systems that use only one setpoint.

In accordance with techniques described herein, a controller circuit may be configured to generate a shift signal to drive the controller circuit to operate in a control loop. For instance, a shift signal may increase a compensation value to drive PWM circuitry to control a SMPS with an on time (e.g., duty cycle) that is greater than a minimum on time value. In this way, the control circuit may operate in a closed loop manner to accommodate for a load increase without delay compared to systems that omit the shift signal.

Figure 1:
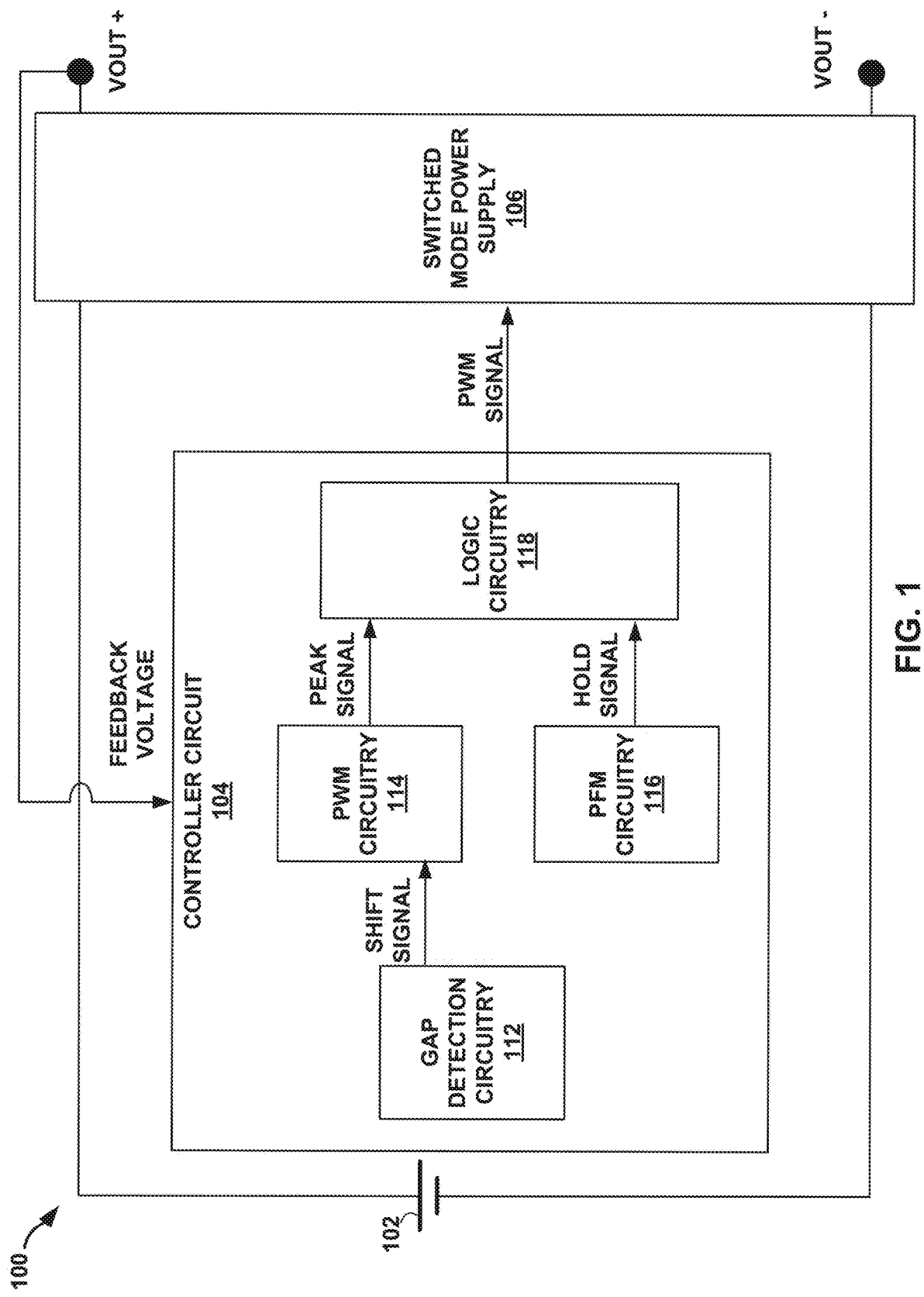
FIG. 1 is a block diagram illustrating an example system for reducing transient effect, in accordance with one or more techniques of this disclosure.

FIG. 1 is a block diagram illustrating an example system for reducing transient effect, in accordance with one or more techniques of this disclosure. As illustrated in the example of FIG. 1A, system 100 may include supply 102, controller circuit 104, and SMPS 106.

Supply 102 may be configured to provide electrical power to one or more other components of system 100. For instance, supply 102 may be configured to supply an input power to SMPS 106. In some examples, supply 102 may be a battery which may be configured to store electrical energy. Examples of batteries may include, but are not limited to, nickel-cadmium, lead-acid, nickel-metal hydride, nickel-zinc, silver-oxide, lithium-ion, lithium polymer, any other type of rechargeable battery, or any combination of the same. In some examples, supply 102 may be an output of a power converter or power inverter. For instance, supply 102 may be an output of a direct current (DC) to DC power converter, an alternating current (AC) to DC power converter, a DC to AC power inverter, and the like. In some examples, supply 102 may represent a connection to an electrical supply grid. In some examples, the input power signal provided by supply 102 may be a DC input power signal. For instance, supply 102 may be configured to provide a DC input power signal in the range of ~5 VDC to ~40 VDC.

Controller circuit 104 may represent circuitry for generating a PWM signal for activating a switching device of SMPS 106. Controller circuit 104 may include gap detection circuitry 112, PWM circuitry 114, PFM circuitry 116, and logic circuitry 118. Gap detection circuitry 112 may be configured to generate a shift signal based on an indication of voltage difference between a reference voltage and a feedback voltage corresponding to voltage output by SMPS 106. PWM circuitry 114 may be configured to generate a peak signal indicating a target PWM on time for the PWM signal. PFM circuitry 116 may be configured to generate a hold signal indicating a target PFM frequency for the PWM signal.

Logic circuitry 118 may be configured to generate the PWM signal for output to SMPS 106 based on the peak signal output by PWM circuitry 114 and the hold signal output by PFM circuitry 116. For example, logic circuitry 118 may be configured to generate the PWM signal comprising frequency corresponding to the target PFM frequency and comprising on time corresponding to a minimum PFM on time value in response to determining that the target PFM frequency is less than a PWM frequency value. In some examples, logic circuitry 118 may be configured to generate the PWM signal comprising frequency corresponding to the PWM frequency value and comprising on time corresponding to the target PWM on time in response to determining that the target PWM on time is greater than the minimum PFM on time value.

SMPS 106 may be configured to generate an output voltage (e.g., "VOUT+" to "VOUT−") using a PWM signal output by controller circuit 104. SMPS 106 may include a switching device. For example, SMPS 106 may be configured to selectively switch a switching device according to the PWM signal to regulate voltage, current, or power output by SMPS 106.

Examples of a switching device may include, but are not limited to, a Silicon Controlled Rectifier (SCR), a Field Effect Transistor (FET), and a Bipolar Junction Transistor (BJT). Examples of a FET may include, but are not limited to, a Junction Field-Effect transistor (JFET), a Metal-Oxide-Semiconductor FET (MOSFET), a dual-gate MOSFET, a FinFETs, an Insulated-Gate Bipolar Transistor (IGBT), any another type of FET, or any combination of the same. Examples of a MOSFET may include, but are not limited to, a PMOS, a NMOS, a DMOS, or any other type of MOSFET, or any combination of the same. Examples of a BJT may include, but are not limited to, a PNP, a NPN, a heterojunction, or any another type of a BJT, or any combination of the same. Switching devices may be voltage-controlled and/or current-controlled. Examples of current-controlled switching devices may include, but are not limited to, gallium nitride (GaN) MOSFETs, BJTs, or other current-controlled elements.

Examples of SMPS 106 may include, but are not limited to, a flyback converter, a buck-boost converter, a buck converter, a boost converter, a auk converter, or another switch-mode power converter. In some examples, SMPS 106 may receive a voltage and output a voltage that is different from the received voltage. For instance, SMPS 106 may receive a battery voltage from supply 102 and output a first voltage that is less than the battery voltage. More specifically, in some examples, SMPS 106 may be a buck converter that bucks (e.g., reduces) voltage received from supply 102.

In accordance with techniques described herein, gap detection circuitry 112 may generate a shift signal based on an indication of voltage difference between a reference voltage and a feedback voltage corresponding to voltage output by SMPS 106. PFM circuitry 116 may generate a hold signal indicating a target PFM frequency for the PWM signal. PWM circuitry 114 may shift, based on the shift signal, a pedestal current to generate a shifted pedestal current and may generate, based on the shifted pedestal current, a peak signal indicating a target PWM on time for the PWM signal. Logic circuitry 118 may generate the PWM signal comprising frequency corresponding to the target PFM frequency and comprising on time corresponding to a minimum PFM on time value in response to determining that the target PFM frequency is less than a PWM frequency value and may generate the PWM signal comprising frequency corresponding to the PWM frequency value and comprising on time corresponding to the target PWM on time in response to determining that the target PWM on time is greater than the minimum PFM on time value.

In this way, controller circuit 104 may effectively shift down the PWM compensation range during a transient, which may help to reduce or eliminate the gap between PFM control and PWM control. As a result, improved performance may be obtained compared to systems that omit a shift signal. Controller circuit 104 may be configured to automatically restore the separation (e.g., gap) between two control loops (e.g., PFM and PWM) as system 100 approaches the new steady state condition. Although the above example refers to PFM and PWM, in other examples, other types of control loops may be used. In some examples, only one control loop may be used. For instance, controller circuit 104 may include PWM circuitry 114 and omit PFM circuitry 116, may include PFM circuitry 116 and omit PWM circuitry 114, or omit both PWM circuitry 114 and PFM circuitry 116 and include another closed loop control technique to temporarily "hack" the control loop in order to minimize output voltage undershoot/overshoot during transients.

Figure 2:
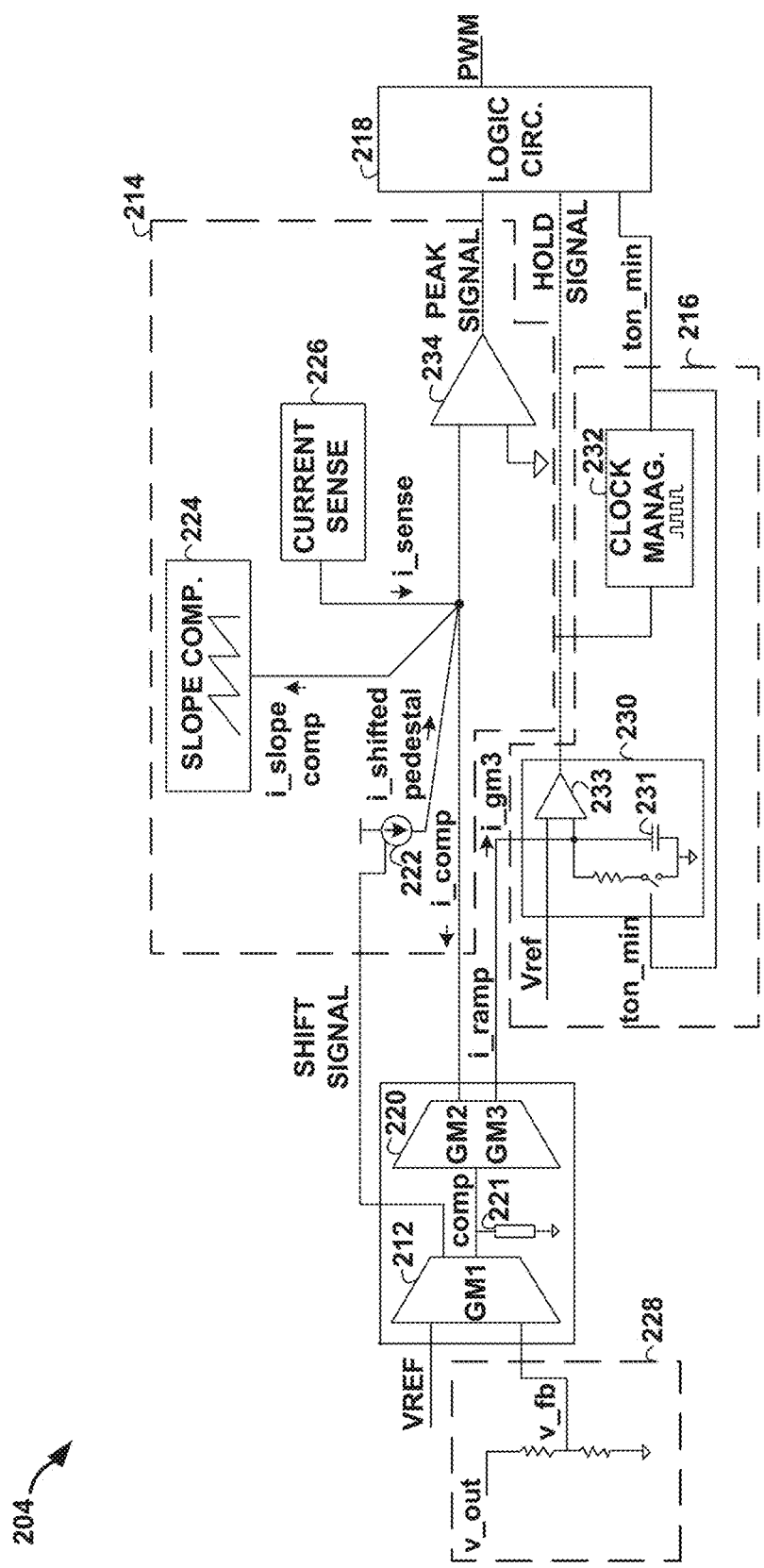
FIG. 2 is a conceptual diagram illustrating a first controller circuit for reducing transient effect, in accordance with one or more techniques of this disclosure.

FIG. 2 is a conceptual diagram illustrating a first controller circuit 204 for reducing transient effect, in accordance with one or more techniques of this disclosure. FIG. 2 is discussed with reference to FIG. 1 for example purposes only. As shown, controller circuit 204 includes PWM circuitry 214, PFM circuitry 216, and logic circuitry 218, which may be examples of PWM circuitry 114, PFM circuitry 116, and logic circuitry 118 of FIG. 1. As shown, controller circuit 204 further includes compensation element 221, voltage divide 228, amplifier 212, and amplifier 220.

Voltage divider 228 may be configured to generate a feedback voltage corresponding to voltage output by a SMPS. For example, voltage divider 228 may include a pair of resistors configured to step down or step up the feedback voltage according to a ratio of resistance between the pair of resistors.

Amplifier 212 may be configured to generate a shift signal based on an indication of a voltage difference between a reference voltage and a feedback voltage corresponding to voltage output by the SMPS. For example, amplifier 212 may generate the shift signal by applying a gain to the voltage difference between a reference voltage and the feedback voltage output by voltage divider 228.

Compensation element 221 may generate a compensation value based on an output of amplifier 212. For example, compensation element 221 may be charged by an indication of a voltage difference between a reference voltage and a feedback voltage corresponding to voltage output by the SMPS that is output by amplifier 212. In some examples, compensation element 221 includes a capacitor. As used herein, a capacitor may include one capacitive element or multiple capacitive elements arranged in series and/or parallel. For example, amplifier 212 may charge and/or discharge the capacitor of compensation element 221 using a voltage signal corresponding to a voltage difference between the reference voltage and the feedback voltage output by voltage divider 228.

Amplifier 220 may generate a compensation current ("i_comp") based on a compensation value at compensation element 221. For example, amplifier 220 may draw a compensation current having a magnitude corresponding to voltage at a capacitor of compensation element 221.

PWM circuitry 214 includes pedestal current source 222, slope compensator 224, current sense 226, and comparator 234. Pedestal current source 222 may be configured to generate a pedestal current corresponding to a minimum inductor current for the SMPS. As shown, pedestal current source 222 may be configured to receive the shift signal to drive pedestal current source 222 to output a shifted pedestal current ("i_shifted pedestal") based on the shift signal. For example, pedestal current source 222 may be configured to generate shifted pedestal current as the pedestal current minus the shift signal. Slope compensator 224 may be configured to generate slope compensation current that increases during the target PWM on time and resets during PWM off time. For example, slope compensator 224 may be configured to generate a triangle wave. Current sense 226 may be configured to generate a sense current corresponding to current output at the SMPS.

Comparator 234 may be configured to generate the peak signal ("PEAK SIGNAL") to indicate when a first summation of the shifted pedestal current ("i_shifted pedestal") and a sense current ("i_sense") corresponding to current output at the SMPS is equal to a second summation of the compensation current ("i_comp") and the slope compensation current ("i_slope comp"). For example, comparator 234 may be configured to generate the PWM signal to transition from a switched-on state to a switched-off state in response to the peak signal indicating that the first summation is equal to the second summation.

PFM circuitry 216 includes ramp generator 230 and clock manager 232. Ramp generator 230 may be configured to generate a voltage ramp signal that increases in voltage at a rate of change corresponding to a compensation value at compensation element 221. For example, amplifier 220 may generate ramp current ("i_ramp") that sets a rate of change corresponding to a compensation value at compensation element 221. In this example, ramp current ("i_ramp") charges capacitor 231 to set the rate of change after the minimum PFM on time value. In this example, comparator 233 resets a hold signal ("HOLD SIGNAL") in response to the voltage ramp signal being greater than or equal to a voltage threshold ("Vref"). Clock manager 232 sets a minimum on time value ("ton_min"). In some examples, clock manager 232 may discharge capacitor 231, for example, before the minimum PFM on time.

Logic circuitry 218 may be configured to generate the PWM signal ("PWM") based on the peak signal, the hold signal, and minimum PFM on time value. In some examples, logic circuitry 219 may be configured to operate with PWM circuitry 214 when the target PWM on time indicated by the peak signal is greater than the minimum PFM on time value.

In some examples, logic circuitry 218 may be configured to operate with PFM circuitry 216 when the target PFM frequency is less than a PWM frequency value. Examples of control loops for logic circuitry 218 are illustrated in Table 1, where fsw is frequency of the PWM signal, fpwm is a frequency of PWM frequency value (e.g., a predetermined frequency value for the PWM control loop), ton is a target PWM on time, and ton_min is a minimum PFM on time value (e.g., a predetermined on time value for the PFM control loop), PWM is the PWM control loop, PFM is the PFM control loop, and GAP is open loop control.

TABLE 1

Example control loops

| Region | Frequency | Pulse width | Regulation |
|---|---|---|---|
| PWM | Constant (fsw = fpwm) | Modulated (ton > ton_min) | Closed loop |
| PFM | Modulated (fsw < fpwm) | Constant (ton = ton_min) | Closed loop |
| GAP | Constant (fsw = fpwm) | Constant (ton = ton_min) | Open loop (transient only) |

In accordance with techniques described herein, the shift signal may "steal" pedestal current to generate a shifted pedestal current, which may reduce or eliminate the gap (e.g., open loop control). As a result, logic circuitry 218 may control a SMPS using PWM circuitry 214 with a smaller compensation value at compensation element 221 compared to systems that omit the shift signal, which may cause PWM circuitry 214 to output a peak signal indicating a target PWM on time (ton) that is greater than the minimum PFM on time (ton_min) to hack the control loop in order to minimize output voltage undershoot/overshoot during transients. In this way, transient effects may be minimized compared to systems that omit the shift signal.

Figure 3:
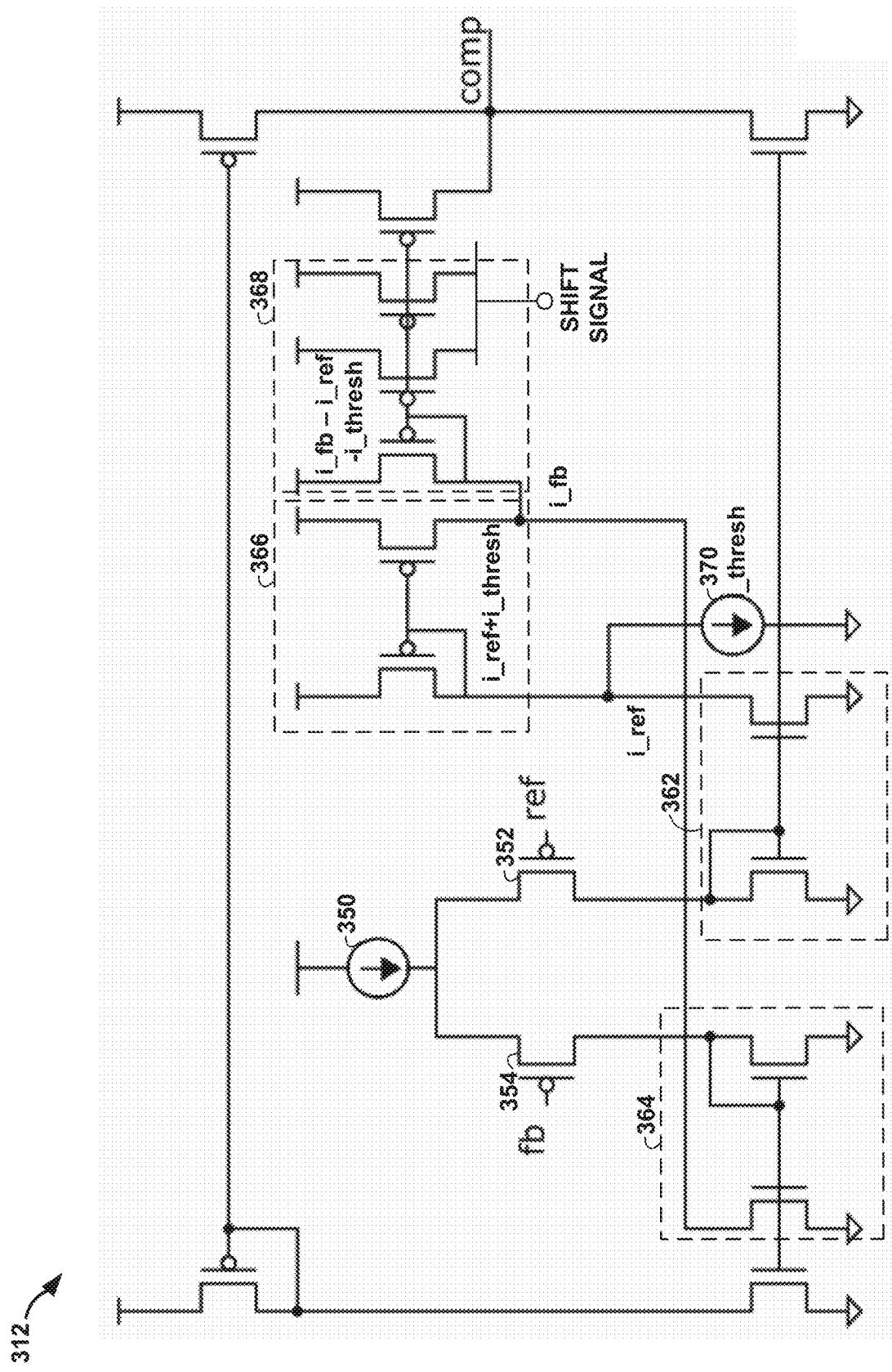
FIG. 3 is a circuit diagram illustrating example gap detection circuitry, in accordance with one or more techniques of this disclosure.

FIG. 3 is a circuit diagram illustrating example gap detection circuitry 312, in accordance with one or more techniques of this disclosure. FIG. 3 is discussed with reference to FIGS. 1-2 for example purposes only. Gap detection circuitry 312 may represent an example of gap detection circuitry 112 of FIG. 1. In some examples, gap detection circuitry 312 may represent a mirror Operational Transconductance Amplifier (OTA) error amplifier. The example of FIG. 3 includes feedback ("fb") voltage transistor 354, reference ("ref") voltage transistor 352, fb current mirror 364, ref current mirror 362, first current mirror 366, and second current mirror 368. The fb voltage sets a resistance of fb voltage transistor 354 and a reference voltage sets a resistance of ref voltage transistor 352. Accordingly, fb current mirror 364 generates a fb current ("i_fb") that corresponds to feedback voltage and ref current mirror 362 generates a ref current ("i_ref") that corresponds to reference voltage.

First current mirror 366 may generate a current corresponding to a summation of the ref current ("i_ref") plus a threshold value ("i_thresh") generated by current source 370. Second current source 368 generates the shift signal to correspond to the feedback current minus the reference current minus the threshold current ("i_fb−i_ref−i_thresh"). In this way, gap detection circuitry 312 may generate the shift signal to comprise current proportional to the voltage difference between the reference voltage and the feedback voltage when the voltage difference is greater than the threshold value.

For example, in steady state condition (e.g., when controller circuit 104 regulates output voltage at SMPS 106 to correspond to a reference voltage), the fb current and the ref current may be equal. In a transient (e.g. fb voltage<ref voltage) the error i_err=i_ref−i_fb may be greater than zero when higher than a defined threshold set by current source 370. In this way, gap detection circuitry 312 may alter the parameters generating the gap between the two loops (e.g., PWM circuitry 114 and PFM circuitry 116) to hack the control loop in order to minimize output voltage undershoot/overshoot during transients.

Figure 4:
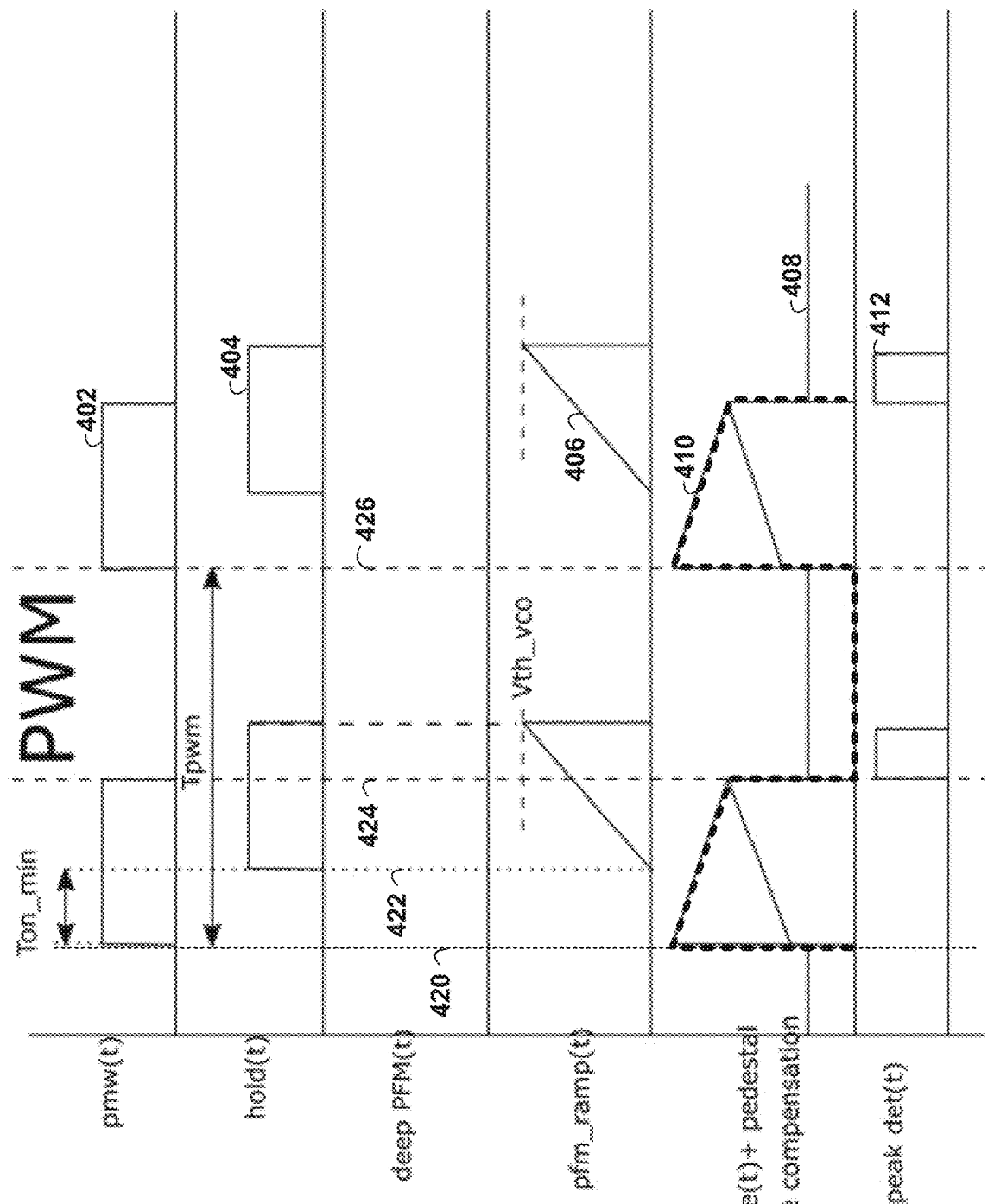
FIG. 4 is a conceptual diagram illustrating performance of Pulse Width Modulation (PWM) to regulate voltage, in accordance with one or more techniques of this disclosure.

FIG. 4 is a conceptual diagram illustrating performance of PWM to regulate voltage, in accordance with one or more techniques of this disclosure. FIG. 4 is discussed with reference to FIGS. 1-3 for example purposes only. The abscissa axis of FIG. 4 represents time and the ordinate axis of FIG. 4 represents voltage at PWM signal 402, voltage at hold signal 404, ramp voltage 406 at capacitor 231, current magnitude for a first summation 408 of the shifted pedestal current and a sense current corresponding to current output at SMPS 106, current magnitude for a second summation 410 of compensation current and slope compensation current, and voltage at peak signal 412.

As shown in FIG. 4, at time 420, a cycle is initialized such that first summation 408 increases as current at an inductor of SMPS 106 increases and PWM signal is set to an active state. Furthermore, at time 420, ramp voltage 406 of capacitor 231 has been reset. At time 422, a minimum PFM on time value elapses, which causes amplifier 220 to charge capacitor 231 with a ramp current corresponding to a compensation value at compensation element 221. At time 424, first summation 408 of the shifted pedestal current and the sense current corresponding to current output at SMPS 106 is equal to second summation 410 of the compensation current and the slope compensation current, which causes comparator 234 to set peak signal 412 to an active state. In response to setting peak signal 412 to the active state, logic circuitry 218 generate the PWM signal 402 to transition from a switched-on state to a switched-off state. As controller circuit 104 operates using PWM, logic circuitry 218 generates PWM signal 402 to include frequency corresponding to the PWM frequency value ("Tpwm") and the process restarts at time 426.

Figure 5:
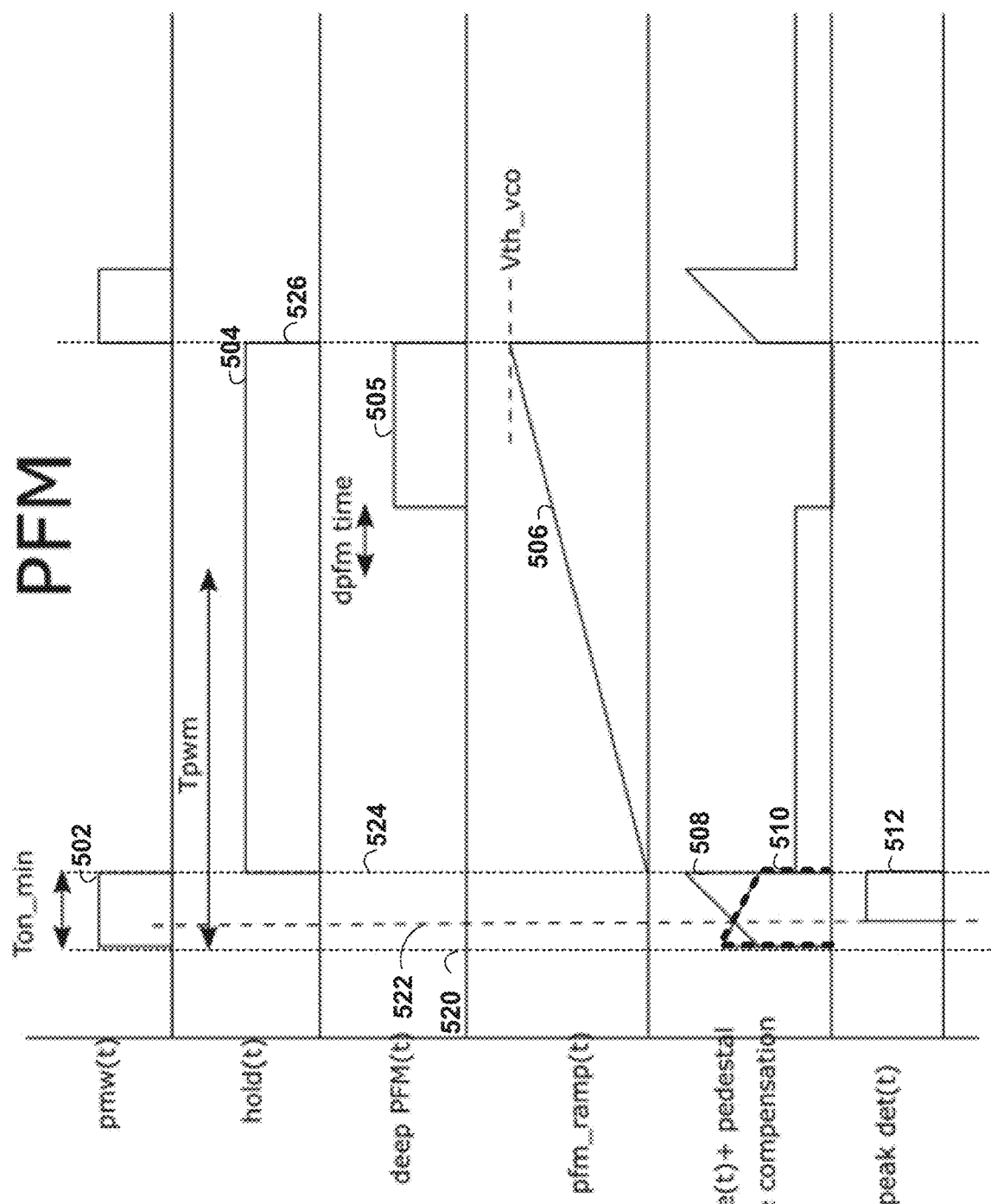
FIG. 5 is a conceptual diagram illustrating performance of Pulse Frequency Modulation (PFM) to regulate voltage, in accordance with one or more techniques of this disclosure.

FIG. 5 is a conceptual diagram illustrating performance of PFM to regulate voltage, in accordance with one or more techniques of this disclosure. FIG. 5 is discussed with reference to FIGS. 1-4 for example purposes only. The abscissa axis of FIG. 5 represents time and the ordinate axis of FIG. 5 represents voltage at PWM signal 502, voltage at hold signal 504, voltage at deep PFM 505, ramp voltage 506 at capacitor 231, current magnitude for a first summation 508 of the shifted pedestal current and a sense current corresponding to current output at SMPS 106, current magnitude for a second summation 510 of compensation current and slope compensation current, and voltage at peak signal 512.

As shown in FIG. 5, at time 520, a cycle is initialized such that first summation 508 increases as current at an inductor of SMPS 106 increases and PWM signal is set to an active state. Moreover, at time 520, ramp voltage 506 of capacitor 231 has been reset. In this example, at time 522, first summation 508 of the shifted pedestal current and the sense current corresponding to current output at SMPS 106 is equal to second summation 510 of the compensation current and the slope compensation current, which causes comparator 234 to set peak signal 512 to an active state. In response to setting peak signal 512 to the active state before the minimum on time, logic circuitry 218 refrains from generating the PWM signal 502 to transition from a switched-on state to a switched-off state. At time 524, a minimum PFM on time value elapses, which causes amplifier 220 to charge capacitor 231 with a ramp current corresponding to a compensation value at compensation element 221. In this example, at time 524, logic circuitry 218 generates the PWM signal 502 to transition from a switched-on state to a switched-off state. At time 526, comparator 233 determines ramp voltage 506 exceeds a reference voltage ("Vth_vco") and resets hold signal 504 and the process restarts.

Figure 6:
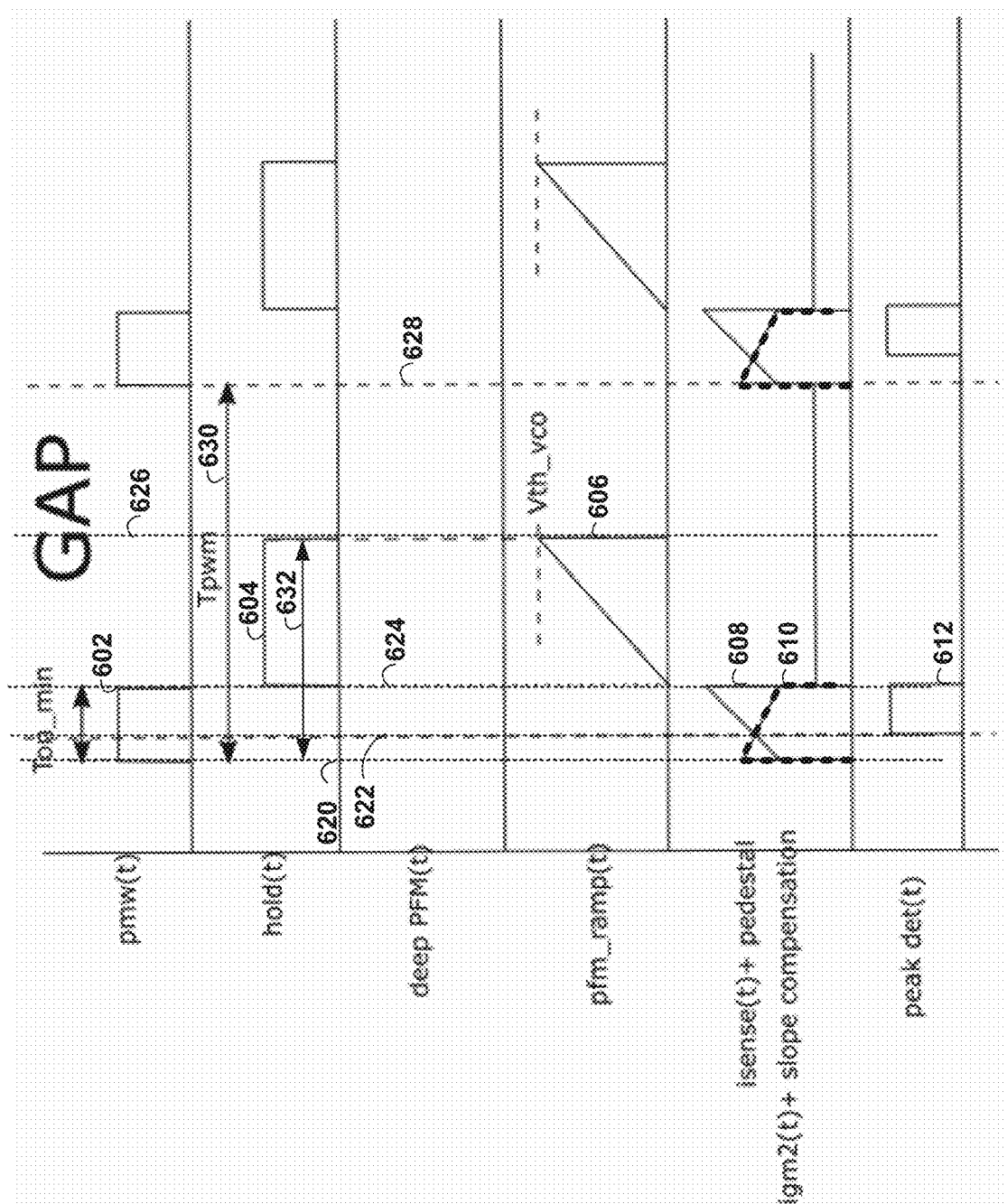
FIG. 6 is a conceptual diagram illustrating performance of gap control to regulate voltage, in accordance with one or more techniques of this disclosure.

FIG. 6 is a conceptual diagram illustrating performance of gap control to regulate voltage, in accordance with one or more techniques of this disclosure. FIG. 6 is discussed with reference to FIGS. 1-5 for example purposes only. The abscissa axis of FIG. 6 represents time and the ordinate axis of FIG. 6 represents voltage at PWM signal 602, voltage at hold signal 604, voltage at deep PFM 605, ramp voltage 606 at capacitor 231, current magnitude for a first summation 608 of the shifted pedestal current and a sense current corresponding to current output at SMPS 106, current magnitude for a second summation 610 of compensation current and slope compensation current, and voltage at peak signal 612.

As shown in FIG. 6, at time 620, a cycle is initialized such that first summation 608 increases as current at an inductor of SMPS 106 increases and PWM signal is set to an active state. Furthermore, at time 620, ramp voltage 606 of capacitor 231 has been reset. In this example, at time 622, first summation 608 of the shifted pedestal current and the sense current corresponding to current output at SMPS 106 is equal to second summation 610 of the compensation current and the slope compensation current, which causes comparator 234 to set peak signal 612 to an active state. In response to setting peak signal 612 to the active state before the minimum on time, logic circuitry 218 refrains from generating the PWM signal 602 to transition from a switched-on state to a switched-off state. At time 624, a minimum PFM on time value elapses, which causes amplifier 220 to charge capacitor 231 with a ramp current corresponding to a compensation value at compensation element 221. In this example, at time 624, logic circuitry 218 generates the PWM signal 402 to transition from a switched-on state to a switched-off state. At time 626, comparator 233 determines ramp voltage 506 exceeds a reference voltage ("Vth_vco"). However, in response to determining the target PFM frequency is not less than a PWM frequency value (e.g., Tpwm 630 is greater than target period 632), logic circuitry 218 restarts the process at time 628.

Figure 7:
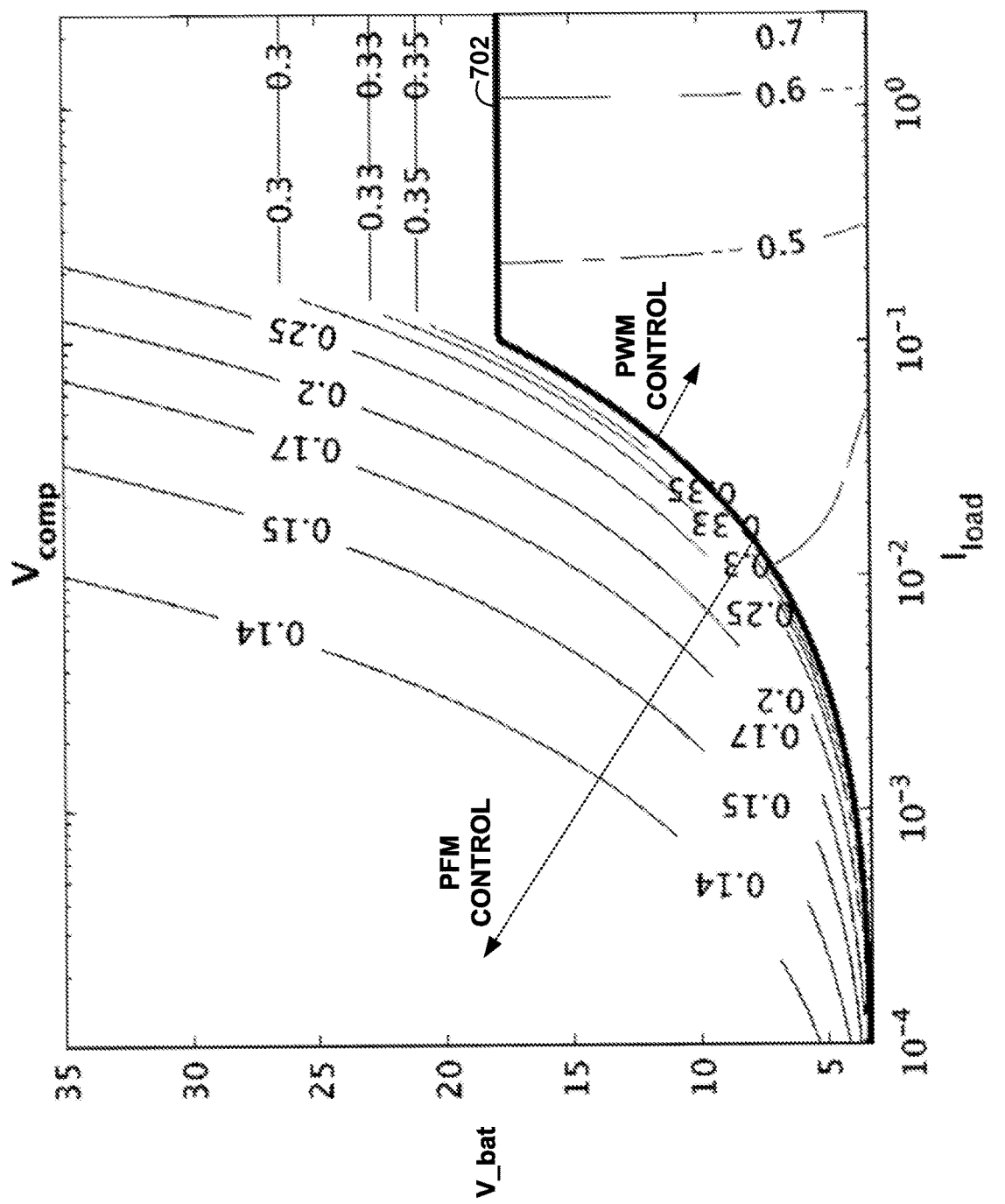
FIG. 7 is a conceptual diagram illustrating a compensation value map, in accordance with one or more techniques of this disclosure.

FIG. 7 is a conceptual diagram illustrating a compensation value map, in accordance with one or more techniques of this disclosure. FIG. 7 is discussed with reference to FIGS. 1-6 for example purposes only. The abscissa axis of FIG. 7 represents load current at SMPS 106 and the ordinate axis of FIG. 7 represents voltage at supply 102. In the example of FIG. 7, controller circuit 104 operates using PFM for compensation values above line 702 and operates using PWM for compensation values below line 702.

Figure 8:
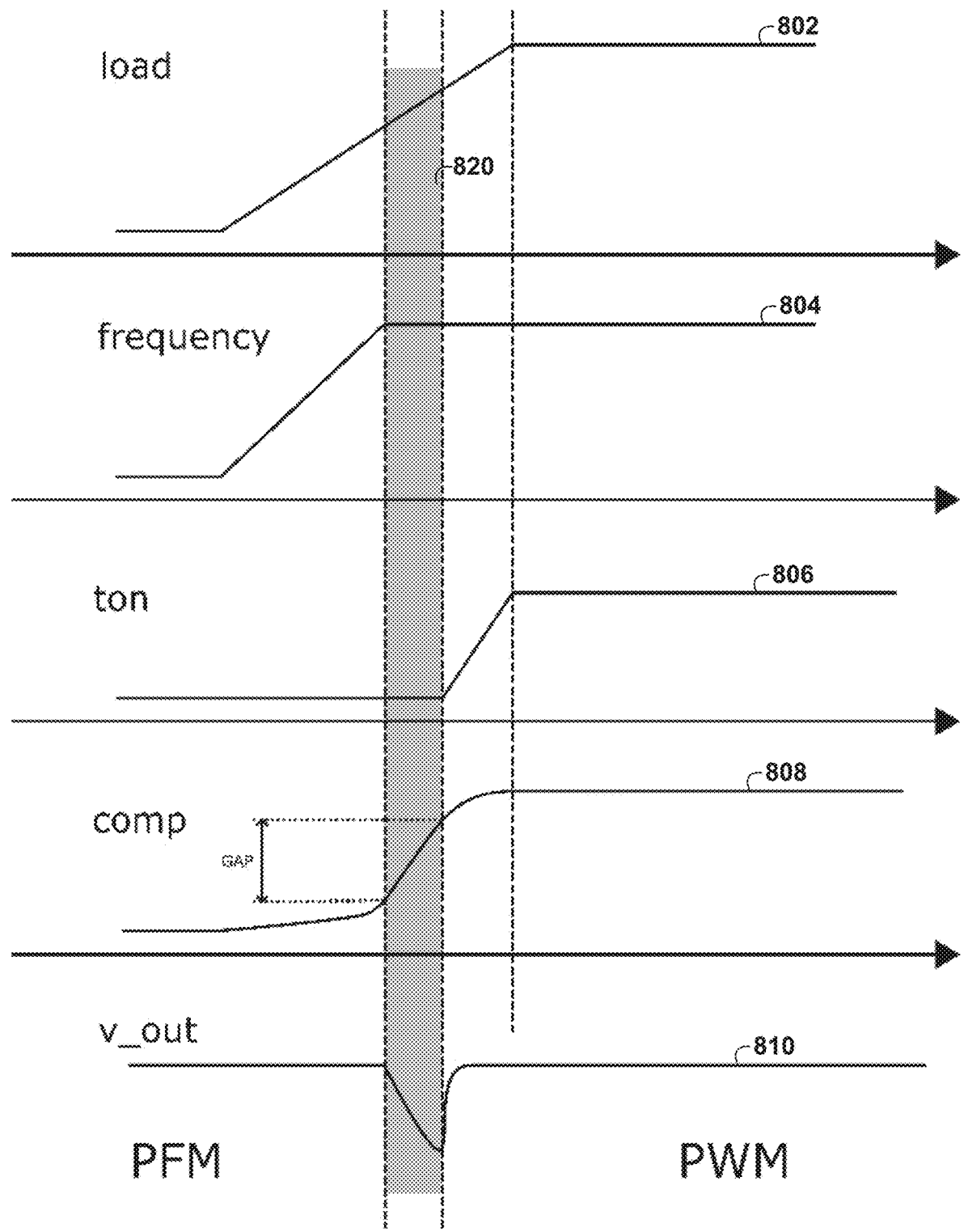
FIG. 8 is a conceptual diagram illustrating a first transition from PFM to PWM, in accordance with one or more techniques of this disclosure.

FIG. 8 is a conceptual diagram illustrating a first transition from PFM to PWM, in accordance with one or more techniques of this disclosure. FIG. 8 is discussed with reference to FIGS. 1-7 for example purposes only. The abscissa axis of FIG. 8 represents time and the ordinate axis of FIG. 8 represents load 802 at SMPS 106, frequency 804 of the PWM signal, on time 806 of the PWM signal, a compensation value 808 at compensation element 221, and output voltage 810 at SMPS 106. In the example of FIG. 8, controller circuit 104 may operate in gap mode in region 820, which may result in undervoltage at output voltage 810.

More specifically, as shown in FIG. 8, a transition occurs when load 802 overcomes a defined threshold. At this time controller circuit 104 may not be able to further increase frequency 804 and on time 806 may be modulated by the PWM loop but may not be active because of a small value of compensation value 808. Accordingly, compensation value 808 may cross the "gap" before activating the PWM loop. In this time interval, however, output voltage 810 is not regulated. As a consequence a big undervoltage can occur at output voltage 810. According to techniques described herein, controller circuit 104 may use a shift signal to reduce or eliminate the gap before activating the PWM loop, which may reduce or eliminate undervoltage at output voltage 810 in response to the changes in load 802.

Figure 9:
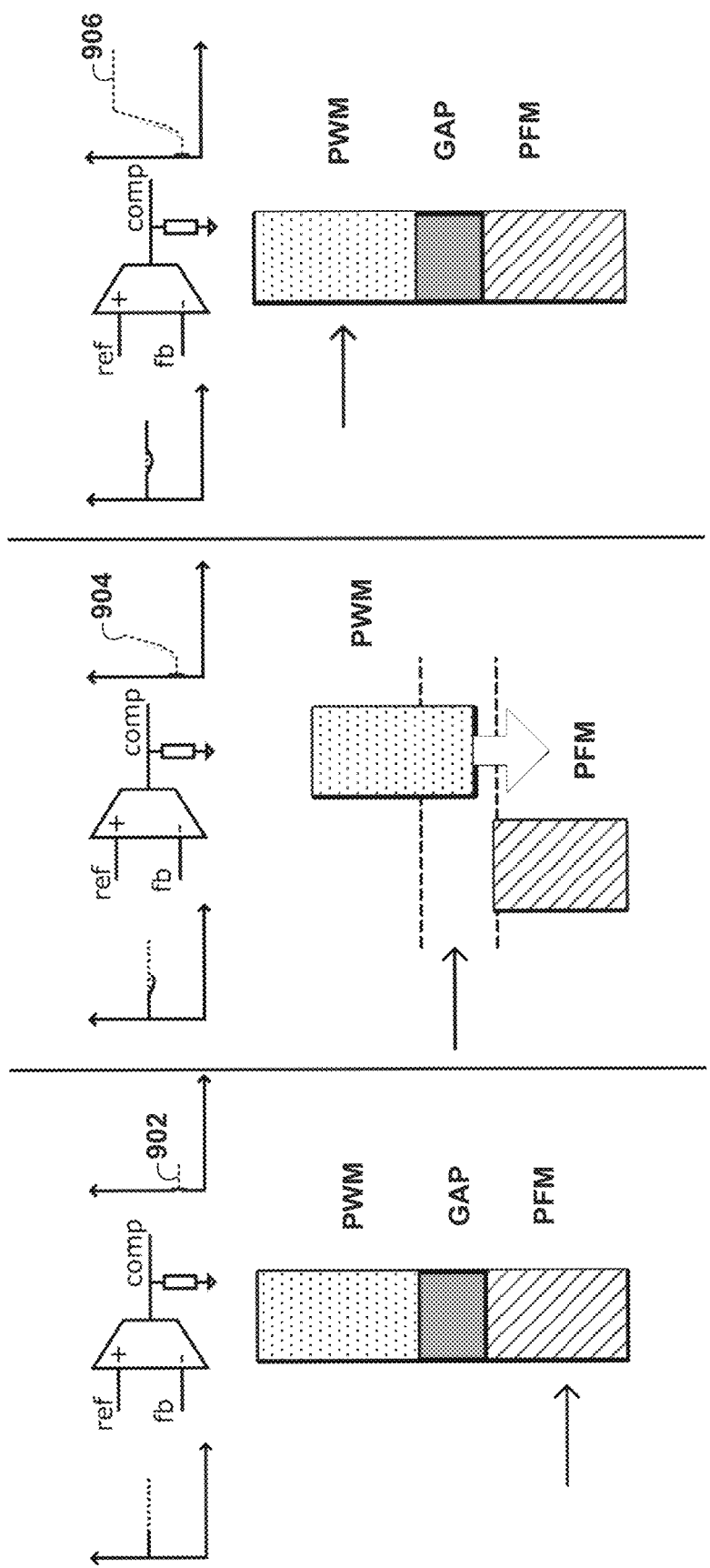
FIG. 9 is a conceptual diagram illustrating a second transition from PFM to PWM, in accordance with one or more techniques of this disclosure.

FIG. 9 is a conceptual diagram illustrating a second transition from PFM to PWM, in accordance with one or more techniques of this disclosure. FIG. 9 is discussed with reference to FIGS. 1-8 for example purposes only. As shown in FIG. 9, during steady state operation, controller circuit 104 operates using PFM due to a relatively low compensation value 902. Next, during a transition period (e.g., an increase in load, decrease in voltage at supply 102, etc.), shifting signal drives compensation value 904 faster and/or to higher values compared to systems that omit the shifting signal. As such, controller circuit 104 reduces or eliminates the gap during the transition period, for example, by operating in a PWM control loop. After the transition period, the shifting signal reduces resulting in compensation value 906 and controller circuit 104 operates in a PWM control loop. In this way, controller circuit 104 may reduce or eliminate the gap compared to systems that omit a shift signal without impacting steady state operation (e.g., PFM, PWM, etc.).

Figure 10:
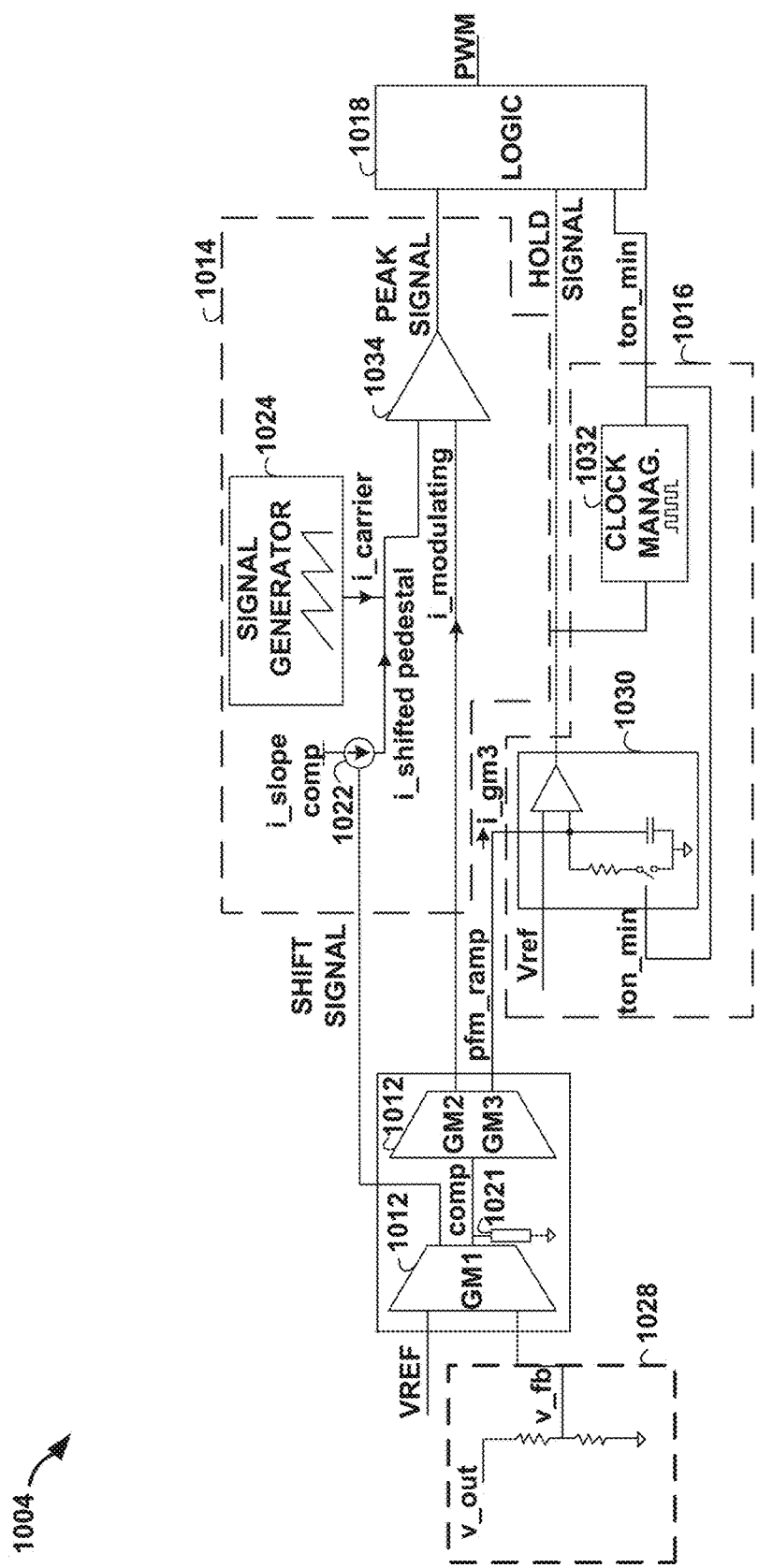
FIG. 10 is a conceptual diagram illustrating a second controller circuit for reducing transient effect, in accordance with one or more techniques of this disclosure.

FIG. 10 is a conceptual diagram illustrating a second system for reducing transient effect, in accordance with one or more techniques of this disclosure. FIG. 10 is discussed with reference to FIGS. 1-9 for example purposes only. As shown in FIG. 10, controller circuit 1004 includes PWM circuitry 1014, PFM circuitry 1016, and logic circuitry 1018, which may be examples of PWM circuitry 114, PFM circuitry 216, and logic circuitry 118 of FIG. 1. In addition, controller circuit 1004 may further includes compensation element 1021, voltage divider 1028, amplifier 1012, and amplifier 1020, which may be substantially similar to compensation element 221, voltage divider 228, amplifier 212, and amplifier 220 of FIG. 2, respectively. PFM circuitry 1016 may be substantially similar to PFM circuitry 216 of FIG. 2. For example, PFM circuitry 1016 may include ramp generator 1030 and clock manager 1032, which may be substantially similar to ramp generator 230 and clock mangers 232 of FIG. 2, respectively.

PWM circuitry 1014 may include pedestal current source 1022, signal generator 1024 and comparator 1034. As shown, pedestal current source 1022 may be configured to receive the shift signal to drive pedestal current source 1022 to output a shifted pedestal current ("i_shifted pedestal") based on the shift signal. For example, pedestal current source 1022 may be configured to generate shifted pedestal current as the pedestal current minus the shift signal.

Amplifier 1012 may be configured to generate a modulating current based on a compensation value at compensation element 1021. Signal generator 1024 may be configured to generate a carrier current that, for each cycle of a plurality of cycles, increases in current at a rate of change. For example, signal generator 1024 may be configured to generate a triangle wave.

Comparator 1034 may be configured to generate the peak signal ("PEAK SIGNAL") to indicate when a summation of the shifted pedestal current ("i_shifted pedestal") and the carrier current ("i_carrier") is equal to the modulating current ("i_modulating"). For example, comparator 1034 generates the peak signal to set when a summation of the shifted pedestal current ("i_shifted pedestal") and the carrier current ("i_carrier") is equal to the modulating current ("i_modulating").

Logic circuitry 1018 may be configured to generate the PWM signal ("PWM") based on the peak signal, the hold signal, and minimum PFM on time value. In some examples, logic circuitry 1018 may be configured to operate with PWM circuitry 1014 when the target PWM on time indicated by the peak signal is greater than the minimum PFM on time value. In some examples, logic circuitry 1018 may be configured to operate with PFM circuitry 1016 when the target PFM frequency is less than a PWM frequency value.

Figure 11:
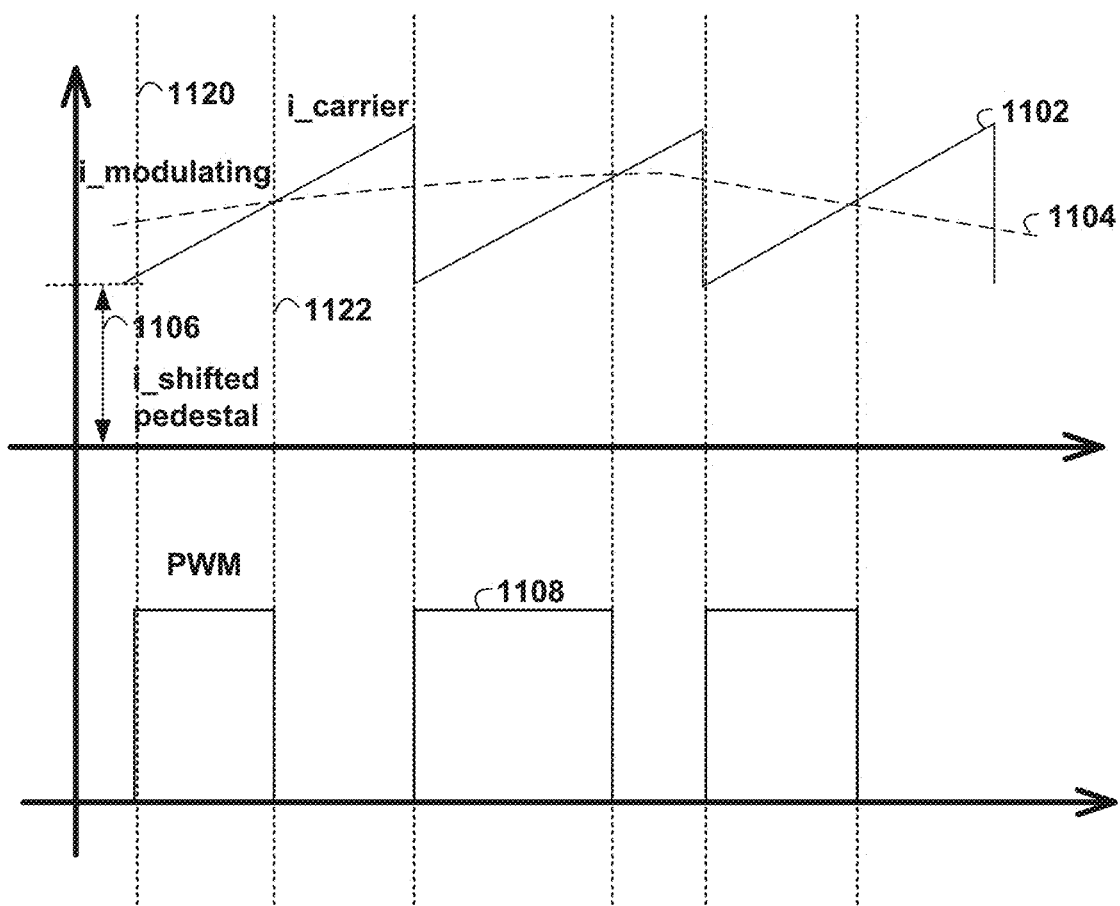
FIG. 11 is a conceptual diagram illustrating PWM using a voltage mode, in accordance with one or more techniques of this disclosure.

FIG. 11 is a conceptual diagram illustrating PWM using a voltage mode, in accordance with one or more techniques of this disclosure. FIG. 11 is discussed with reference to FIGS. 1-10 for example purposes only. The abscissa axis of FIG. 11 represents time and the ordinate axis of FIG. 11 represents current magnitude at the carrier current 1102 output by signal generator 1024, current magnitude at the modulating current 1104 output by amplifier 1012, and voltage at peak signal 1108 output by comparator 1034.

As shown in FIG. 11, at time 1120, a cycle is initialized such that carrier current 1102, which is offset by the shifted pedestal current output by pedestal current source 1022, increases as current at an inductor of SMPS 106 increases and PWM signal 1108 is set to an active state. At time 1122, in response to determining that modulating current 1104 equals carrier current 1102, comparator 1034 resets PWM signal 1108. While the example of FIG. 11 was discussed with current, in some examples, voltage mode may instead use voltage.

Figure 12:
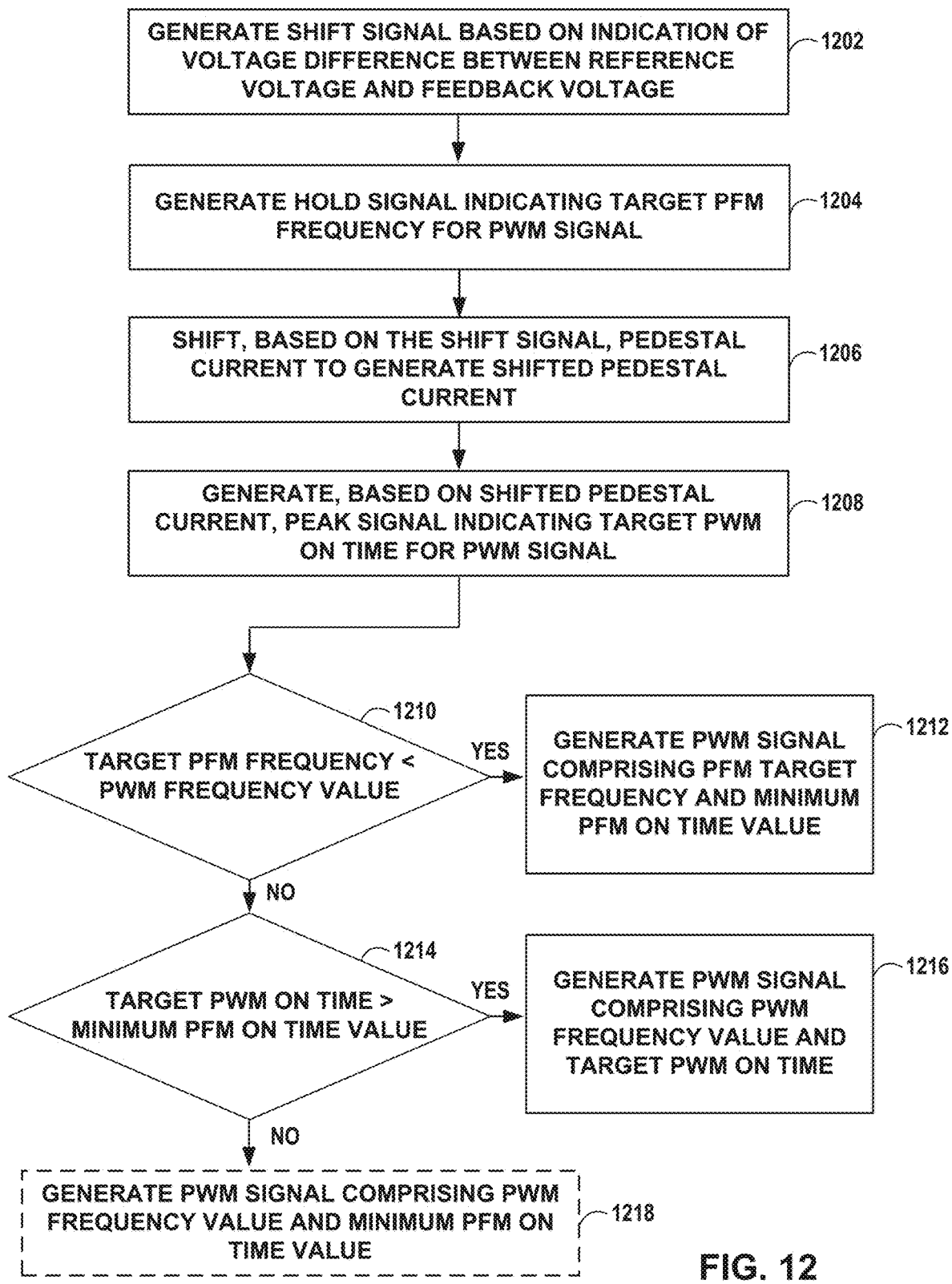
FIG. 12 is a flow diagram illustrating a process for reducing transient effect, in accordance with this disclosure.

FIG. 12 is a flow diagram illustrating a process for reducing transient effect, in accordance with this disclosure. FIG. 12 is described with reference to FIGS. 1-11 for example purposes only. According to the example of FIG. 12, gap detection circuitry 112 generates a shift signal based on an indication of a voltage difference between a reference voltage and a feedback voltage corresponding to voltage output by SMPS 106 (1202). PFM circuitry 116 generates a hold signal indicating a target PFM frequency for the PWM signal (1204). PWM circuitry 116 shifts, based on the shift signal, a pedestal current to generate a shifted pedestal current (1206). PWM circuitry generates, based on the shifted pedestal current, a peak signal indicating a target PWM on time for the PWM signal (1208).

Logic circuitry 118 determines whether the target PFM frequency is less than a PWM frequency value (1210). In response to determining that the target PFM frequency is less than the PWM frequency value ("YES" of decision block 1210), logic circuitry 118 generates the PWM signal comprising frequency corresponding to the target PFM frequency and comprising on time corresponding to a minimum PFM on time value (1212). In response to determining that the target PFM frequency is not less than the PWM frequency value ("NO" of decision block 1210), logic circuitry 118 determines whether the target PWM on time is greater than the minimum PFM on time value (1214).

In response to determining that the target PWM on time is greater than the minimum PFM on time value ("YES" of decision block 1214), logic circuitry 118 generates the PWM signal comprising frequency corresponding to the PWM frequency value and comprising on time corresponding to the target PWM on time (1216). In response to determining that the target PWM on time is not greater than the minimum PFM on time value ("NO" of decision block 1214), logic circuitry 118 optionally generates the PWM signal comprising PWM frequency value and minimum PFM on time value (1218).

The following examples may illustrate one or more aspects of the disclosure.

Example 1

A controller circuit for generating a Pulse-Width Modulation (PWM) signal for activating a switching device of a Switched-Mode Power Supply (SMPS), the controller circuit comprising: gap detection circuitry configured to generate a shift signal based on an indication of a voltage difference between a reference voltage and a feedback voltage corresponding to voltage output by the SMPS; Pulse Frequency Modulated (PFM) circuitry configured to generate a hold signal indicating a target PFM frequency for the PWM signal; PWM circuitry configured to shift, based on the shift signal, a pedestal current to generate a shifted pedestal current and to generate, based on the shifted pedestal current, a peak signal indicating a target PWM on time for the PWM signal; and logic circuitry configured to: in response to determining that the target PFM frequency is less than a PWM frequency value, generate the PWM signal comprising frequency corresponding to the target PFM frequency and comprising on time corresponding to a minimum PFM on time value; and in response to determining that the target PWM on time is greater than the minimum PFM on time value, generate the PWM signal comprising frequency corresponding to the PWM frequency value and comprising on time corresponding to the target PWM on time.

Example 2

The controller circuit of example 1, wherein the logic circuitry is configured to: in response to determining that the target PFM frequency is greater than or equal to the PWM frequency value and the target PWM on time is less than or equal to the minimum PFM on time value, generate the PWM signal comprising frequency corresponding to the PWM frequency value and comprising on time corresponding to the minimum PFM on time value.

Example 3

The controller circuit of any combination of examples 1-2, wherein, to generate the shift signal, the gap detection circuitry is configured to: generate the shift signal to comprise current proportional to the voltage difference between the reference voltage and the feedback voltage when the voltage difference is greater than a threshold value.

Example 4

The controller circuit of any combination of examples 1-3, wherein the gap detection circuitry comprises an operational transconductance amplifier (OTA) including a first input coupled to the reference voltage, a second input coupled to the feedback voltage, and an output configured to output the shift signal.

Example 5

The controller circuit of any combination of examples 1-4, wherein the PWM circuitry is configured to: generate the pedestal current to correspond to a minimum inductor current for the SMPS.

Example 6

The controller circuit of any combination of examples 1-5, wherein, to shift the pedestal current, the PWM circuitry is configured to: subtract the shift signal from the pedestal current.

Example 7

The controller circuit of any combination of examples 1-6, wherein, to generate the peak signal, the PWM circuitry is configured to: generate a compensation current based on a compensation value at a compensation element, wherein the compensation value is based on the voltage difference between the reference voltage and the feedback voltage; generate a slope compensation current that increases during the target PWM on time; and generate the peak signal to indicate when a first summation of the shifted pedestal current and a sense current corresponding to current output at the SMPS is equal to a second summation of the compensation current and the slope compensation current.

Example 8

The controller circuit of any combination of examples 1-7, wherein, to generate the PWM signal, the PWM circuitry is configured to: generate the PWM signal to transition from a switched-on state to a switched-off state in response to the peak signal indicating that the first summation is equal to the second summation.

Example 9

The controller circuit of any combination of examples 1-8, wherein the compensation value is further based on the shift signal.

Example 10

The controller circuit of any combination of examples 1-9, wherein, to generate the peak signal, the PWM circuitry is configured to: generate a carrier current or voltage that, for each cycle of a plurality of cycles, increases in current or voltage at a rate of change; and generate a modulating current or voltage based on a compensation value at a compensation element, wherein the compensation value is based on the voltage difference between the reference voltage and the feedback voltage.

Example 11

The controller circuit of any combination of examples 1-10, wherein, to generate the PWM signal, the PWM circuitry is configured to: generate the PWM signal to transition from a switched-on state to a switched-off state in response to a summation of the shifted pedestal current or voltage and the carrier current or voltage being equal to the modulating current or voltage.

Example 12

The controller circuit of any combination of examples 1-11, wherein the compensation value is further based on the shift signal.

Example 13

The controller circuit of any combination of examples 1-12, wherein, to generate the hold signal, the PFM circuitry is configured to, for each cycle: after the minimum PFM on time value, initiate a voltage ramp signal and set the hold signal to a turned-on state, wherein the voltage ramp signal increases in voltage at a rate of change corresponding to a compensation value at a compensation element, wherein the compensation value is based on the voltage difference between the reference voltage and the feedback voltage; and reset the hold signal to a turned-off state in response to the voltage ramp signal being greater than or equal to a voltage threshold.

Example 14

A method for generating a Pulse-Width Modulation (PWM) signal for activating a switching device of a Switched-Mode Power Supply (SMPS), the method comprising: generating a shift signal based on an indication of a voltage difference between a reference voltage and a feedback voltage corresponding to voltage output by the SMPS; generating a hold signal indicating a target Pulse Frequency Modulated (PFM) frequency for the PWM signal; shifting, based on the shift signal, a pedestal current to generate a shifted pedestal current; generating, based on the shifted pedestal current, a peak signal indicating a target PWM on time for the PWM signal; in response to determining that the target PFM frequency is less than a PWM frequency value, generating the PWM signal comprising frequency corresponding to the target PFM frequency and comprising on time corresponding to a minimum PFM on time value; and in response to determining that the target PWM on time is greater than the minimum PFM on time value, generating the PWM signal comprising frequency corresponding to the PWM frequency value and comprising on time corresponding to the target PWM on time.

Example 15

The method of example 14, further comprising: in response to determining that the target PFM frequency is greater than or equal to the PWM frequency value and the target PWM on time is less than or equal to the minimum PFM on time value, generating the PWM signal comprising frequency corresponding to the PWM frequency value and comprising on time corresponding to the minimum PFM on time value.

Example 16

The method of any combination of examples 14-15, wherein generating the shift signal comprises: generating the shift signal to comprise current proportional to the voltage difference between the reference voltage and the feedback voltage when the voltage difference is greater than a threshold value.

Example 17

The method of any combination of examples 14-16, further comprising: generate the pedestal current to correspond to a minimum inductor current for the SMPS.

Example 18

The method of any combination of examples 14-17, wherein shifting the pedestal current comprises: subtracting the shift signal from the pedestal current.

Example 19

A circuit for switching a Switched-Mode Power Supply (SMPS), the circuit comprising: a switching device configured to switch in and switch out based on a Pulse-Width Modulation (PWM) signal; gap detection circuitry configured to generate a shift signal based on an indication of a voltage difference between a reference voltage and a feedback voltage corresponding to voltage output by the SMPS; PWM circuitry configured to shift, based on the shift signal, a pedestal current to generate a shifted pedestal current and to generate, based on the shifted pedestal current, a peak signal indicating a target PWM on time for the PWM signal; and logic circuitry configured to, in response to determining that the target PWM on time is greater than a minimum on time value, generate the PWM signal comprising frequency corresponding to a PWM frequency value and comprising on time corresponding to the target PWM on time.

Example 20

The circuit of example 19, wherein the minimum on time is a minimum Pulse Frequency Modulated (PFM) on time value, the circuit further comprising: PFM circuitry configured to generate a hold signal indicating a target PFM frequency for the PWM signal, wherein the logic circuitry is further configured to, in response to determining that the target PFM frequency is less than the PWM frequency value, generate the PWM signal comprising frequency corresponding to the target PFM frequency and comprising on time corresponding to the minimum PFM on time value.

Various aspects have been described in this disclosure. These and other aspects are within the scope of the following claims.

The invention claimed is:

1. A controller circuit for generating a Pulse-Width Modulation (PWM) signal for activating a switching device of a Switched-Mode Power Supply (SMPS), the controller circuit comprising:
   gap detection circuitry configured to generate a shift signal based on an indication of a voltage difference between a reference voltage and a feedback voltage corresponding to voltage output by the SMPS;
   Pulse Frequency Modulated (PFM) circuitry configured to generate a hold signal indicating a target PFM frequency for the PWM signal;
   PWM circuitry configured to shift, based on the shift signal, a pedestal current to generate a shifted pedestal current and to generate, based on the shifted pedestal current, a peak signal indicating a target PWM on time for the PWM signal; and
   logic circuitry configured to:
      in response to determining that the target PFM frequency is less than a PWM frequency value, generate the PWM signal comprising frequency corresponding to the target PFM frequency and comprising on time corresponding to a minimum PFM on time value; and
      in response to determining that the target PWM on time is greater than the minimum PFM on time value, generate the PWM signal comprising frequency corresponding to the PWM frequency value and comprising on time corresponding to the target PWM on time.

2. The controller circuit of claim 1, wherein the logic circuitry is configured to:
   in response to determining that the target PFM frequency is greater than or equal to the PWM frequency value and the target PWM on time is less than or equal to the minimum PFM on time value, generate the PWM signal comprising frequency corresponding to the PWM frequency value and comprising on time corresponding to the minimum PFM on time value.

3. The controller circuit of claim 1, wherein, to generate the shift signal, the gap detection circuitry is configured to:
   generate the shift signal to comprise current proportional to the voltage difference between the reference voltage and the feedback voltage when the voltage difference is greater than a threshold value.

4. The controller circuit of claim 3, wherein the gap detection circuitry comprises an operational transconductance amplifier (OTA) including a first input coupled to the reference voltage, a second input coupled to the feedback voltage, and an output configured to output the shift signal.

5. The controller circuit of claim 1, wherein the PWM circuitry is configured to:
   generate the pedestal current to correspond to a minimum inductor current for the SMPS.

6. The controller circuit of claim 1, wherein, to shift the pedestal current, the PWM circuitry is configured to:
   subtract the shift signal from the pedestal current.

7. The controller circuit of claim 1, wherein, to generate the peak signal, the PWM circuitry is configured to:
   generate a compensation current based on a compensation value at a compensation element, wherein the compensation value is based on the voltage difference between the reference voltage and the feedback voltage;
   generate a slope compensation current that increases during the target PWM on time; and
   generate the peak signal to indicate when a first summation of the shifted pedestal current and a sense current corresponding to current output at the SMPS is equal to a second summation of the compensation current and the slope compensation current.

8. The controller circuit of claim 7, wherein, to generate the PWM signal, the PWM circuitry is configured to:
   generate the PWM signal to transition from a switched-on state to a switched-off state in response to the peak signal indicating that the first summation is equal to the second summation.

9. The controller circuit of claim 7, wherein the compensation value is further based on the shift signal.

10. The controller circuit of claim 1, wherein, to generate the peak signal, the PWM circuitry is configured to:
    generate a carrier current or voltage that, for each cycle of a plurality of cycles, increases in current or voltage at a rate of change; and
    generate a modulating current or voltage based on a compensation value at a compensation element, wherein the compensation value is based on the voltage difference between the reference voltage and the feedback voltage.

11. The controller circuit of claim 10, wherein, to generate the PWM signal, the PWM circuitry is configured to:
generate the PWM signal to transition from a switched-on state to a switched-off state in response to a summation of the shifted pedestal current or voltage and the carrier current or voltage being equal to the modulating current or voltage.

12. The controller circuit of claim 10, wherein the compensation value is further based on the shift signal.

13. The controller circuit of claim 1, wherein, to generate the hold signal, the PFM circuitry is configured to, for each cycle:
after the minimum PFM on time value, initiate a voltage ramp signal and set the hold signal to a turned-on state, wherein the voltage ramp signal increases in voltage at a rate of change corresponding to a compensation value at a compensation element, wherein the compensation value is based on the voltage difference between the reference voltage and the feedback voltage; and
reset the hold signal to a turned-off state in response to the voltage ramp signal being greater than or equal to a voltage threshold.

14. A method for generating a Pulse-Width Modulation (PWM) signal for activating a switching device of a Switched-Mode Power Supply (SMPS), the method comprising:
generating a shift signal based on an indication of a voltage difference between a reference voltage and a feedback voltage corresponding to voltage output by the SMPS;
generating a hold signal indicating a target Pulse Frequency Modulated (PFM) frequency for the PWM signal;
shifting, based on the shift signal, a pedestal current to generate a shifted pedestal current;
generating, based on the shifted pedestal current, a peak signal indicating a target PWM on time for the PWM signal;
in response to determining that the target PFM frequency is less than a PWM frequency value, generating the PWM signal comprising frequency corresponding to the target PFM frequency and comprising on time corresponding to a minimum PFM on time value; and
in response to determining that the target PWM on time is greater than the minimum PFM on time value, generating the PWM signal comprising frequency corresponding to the PWM frequency value and comprising on time corresponding to the target PWM on time.

15. The method of claim 14, further comprising:
in response to determining that the target PFM frequency is greater than or equal to the PWM frequency value and the target PWM on time is less than or equal to the minimum PFM on time value, generating the PWM signal comprising frequency corresponding to the PWM frequency value and comprising on time corresponding to the minimum PFM on time value.

16. The method of claim 14, wherein generating the shift signal comprises:
generating the shift signal to comprise current proportional to the voltage difference between the reference voltage and the feedback voltage when the voltage difference is greater than a threshold value.

17. The method of claim 16, further comprising:
generate the pedestal current to correspond to a minimum inductor current for the SMPS.

18. The method circuit of claim 14, wherein shifting the pedestal current comprises:
subtracting the shift signal from the pedestal current.

19. A circuit for switching a Switched-Mode Power Supply (SMPS), the circuit comprising: a switching device configured to switch in and switch out based on a Pulse-Width Modulation (PWM) signal; gap detection circuitry configured to generate a shift signal based on an indication of a voltage difference between a reference voltage and a feedback voltage corresponding to voltage output by the SMPS; PWM circuitry configured to shift, based on the shift signal, a pedestal current to generate a shifted pedestal current and to generate, based on the shifted pedestal current, a peak signal indicating a target PWM on time for the PWM signal; and logic circuitry configured to, in response to determining that the target PWM on time is greater than a minimum on time value, generate the PWM signal comprising frequency corresponding to a PWM frequency value and comprising on time corresponding to the target PWM on time; wherein the minimum on time is a minimum Pulse Frequency Modulated (PFM) on time value, the circuit further comprising: PFM circuitry configured to generate a hold signal indicating a target PFM frequency for the PWM signal, wherein the logic circuitry is further configured to, in response to determining that the target PFM frequency is less than the PWM frequency value, generate the PWM signal comprising frequency corresponding to the target PFM frequency and comprising on time corresponding to the minimum PFM on time value.

* * * * *